United States Patent [19]

Beach

[11] 4,117,295
[45] Sep. 26, 1978

[54] APPARATUS FOR ANNEALING OF WIRE

[75] Inventor: Shirley Beach, North Vancouver, Canada

[73] Assignee: Phillips Cable Limited, Ontario, Canada

[21] Appl. No.: 742,177

[22] Filed: Nov. 16, 1976

[30] Foreign Application Priority Data

Nov. 17, 1975 [CA] Canada .................................. 239815

[51] Int. Cl.² .............................................. H05B 5/08
[52] U.S. Cl. .............................. 219/10.61 R; 219/155; 266/104
[58] Field of Search ............... 219/10.61, 10.67, 10.57, 219/10.41, 6.5, 7.5, 56, 155, 156, 10.47; 339/5 RL, 6 RL, 8 RL, 277 R; 266/103, 104; 148/147, 150, 154, 155, 156

[56] References Cited

U.S. PATENT DOCUMENTS

| 2,459,507 | 1/1949 | Denham | 219/10.61 |
| 2,993,114 | 7/1961 | Bunch et al. | 266/104 |
| 3,103,571 | 9/1963 | Axelsson et al. | 219/10.61 |

Primary Examiner—Bruce A. Reynolds
Attorney, Agent, or Firm—Charles A. Laff; J. Warren Whitesel; Howard B. Rockman

[57] ABSTRACT

The rim of the upper sheave in a wire induction heating apparatus contains a peripheral groove. The wire passes over a portion of the groove twice, and overlaps for a certain portion. The width of the groove at a height one half the wire width from the bottom supporting surface of the groove is from one and one half to less than two times the width of the wire.

12 Claims, 6 Drawing Figures

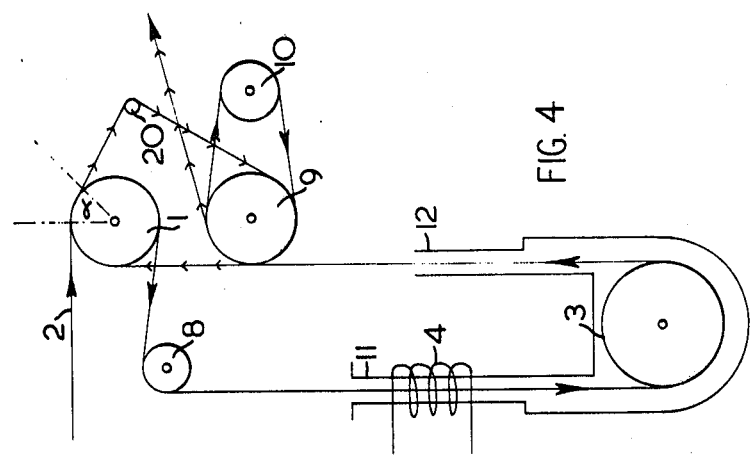
FIG. 4
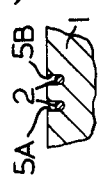
FIG. 2A
FIG. 2B
PRIOR ART
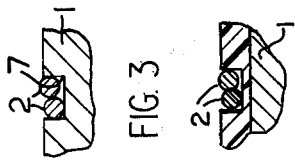
FIG. 3
FIG. 3a
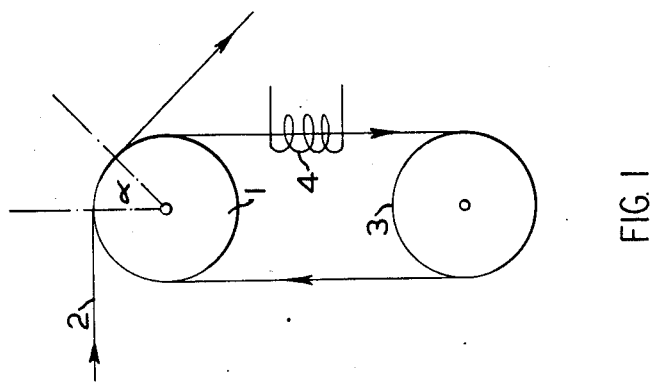
FIG. 1

APPARATUS FOR ANNEALING OF WIRE

This invention relates to a machine used for the induction heating and annealing of wire.

After cold drawing, wire is often annealed in order to reestablish its deteriorated grain structure and remove brittle properties which may have been imparted. The annealing step is often done by induction, by which the wire is passed through an induction coil, heated, and then cooled. The induction coil forms a primary of a transformer, and the wire must be passed over pulleys or sheaves in such manner that it forms a closed electrical circuit of a transformer of which the induction coil is considered as the primary. In this manner current is induced and heating initiated.

In order to form the secondary of the transformer, the wire is usually passed over a first sheave, through an induction coil, around a second sheave which is often immersed in a cooling water bath, and back over the first sheave. The first sheave is made of conducting material such as bronze, and good contact between the wire as it first passes over the sheave, through the sheave, to the wire as it passes over the sheave a second time, is expected. A short circuited loop of wire passing around the second or lower sheave is thus produced.

However, with certain kinds of wire such as aluminum or aluminum iron alloy, the surface of the wire is usually oxidized, and aluminum oxide from the wire has been found to build up on the edge of the sheave, acting as an insulator, causing sparking and uneven annealing. This has resulted in a less than perfect wire product, and the machine has been found to require periodic shutdown for cleaning.

Techniques have been proposed for causing rubbing contact between the edges of the wire as it passes over the first sheave. One such technique is to cross the wires where they touch the sheave, but it has been found that with the crossover, the wire does not run smoothly, as the exiting portion is snatched out from beneath the entering portion in jerks.

The present invention provides a structure whereby a reliable short circuited induction coil loop is obtained while oxidizing wire such as aluminum is used, and the structure removes the aforenoted uneven pay-out of the exiting wire from the sheave, resulting in a smoothly running machine.

The inventive apparatus for use during induction heating of the wire comprises an upper sheave for supporting a wire to be induction heated around a defined portion of its periphery, and for supporting the wire after induction heating around the second defined portion of its periphery, there being an overlap of the first and second portions. In the improvement, a peripheral groove is provided around the rim of the sheave for simultaneously retaining both wires around said portion of the sheave, the width of the groove at a height ½ the wire width from the bottom supporting surface of the groove being from 1¼ to less than 2 times the width of the wire. As both cannot be supported in parallel by the bottom supporting surface of the groove at the same time, there is considerable contact pressure between the two, resulting in good electrical contact. Preferably, the inner surface of the groove is electrically insulating.

In a further embodiment the angle of overlap between the feeding and exiting wire as measured on the sheave is about 45° or less.

A smooth running induction heating apparatus is thus obtained, with a highly effective short circuited secondary of the resulting induction coil.

A better understanding of the invention will be obtained by reference to the description below, and the following drawings, in which:

FIG. 1 depicts a simple wire induction heating apparatus;

FIGS. 2(a) and 2(b) show sectional views at the surface of the edge of prior art upper sheaves in an induction heating apparatus;

FIGS. 3 and 3a show sectional views of the surface of two forms of the upper sheave according to this invention;

FIG. 4 shows a preferred form of wire induction heating apparatus.

Turning first to FIG. 1, an upper sheave 1 is shown, for supporting wire 2 which is to be induction heated, passing around a first portion of its periphery. The wire can be seen entering approximately horizontally, and exiting downwardly vertically, whereby the portion of the periphery of the upper sheave supporting the wire subtends an angle on the sheave of about 90°.

The wire 2 is passed around a lower sheave 3, which is displaced from the upper sheave. The wire then passes around another part of the periphery of the upper sheave 1, and exits at the right of the upper sheave.

An induction coil 4 is located along the wire between the upper and lower sheaves, through which the wire 2 is passed. While it is not essential, the induction coil has been placed so that the wire passes through it prior to passing around the lower sheave. The lower sheave is often immersed in water in order that the heated wire can be cooled.

It may be seen that with the wire 2 short circuited on itself around the upper sheave, a short circuited one turn transformer secondary winding to the induction coil primary is achieved. Often the wire is passed around sheaves and pulleys in such manner that more than a one turn secondary is obtained, but this is not to the point of the present invention.

While the wire, passing around the upper sheave 1 for the second time is shown at a sheave angle of about 135°, the first and second portions of the periphery of the sheave over which the wire overlaps is only the angle α.

As noted earlier, it is desirable to have the wire short circuiting on itself at the upper sheave in order to produce a properly functioning induction coil transformer secondary winding. FIGS. 2(a) and 2(b) depict two ways in which attempts have been made to achieve the short circuit. In FIG. 2(a), the successive portions of wire 2 are disposed in individual channels 5a and 5b, each channel being annular and separate. The upper sheave 1 is usually made of a good conducting material such as bronze, hardened around its rim so as to obtain a minimally wearing surface within the grooves 5a and 5b. As the pair of wires pass within the grooves over the upper sheave 1, conduction is made through the conductive sheave.

As explained earlier, sometimes the kind of wire used is conducive to the formation of oxides. The structure of FIG. 2(b) has been proposed in U.S. Pat. No. 2,459,507 to R. H. Denham, issued Jan. 8, 1949 as a means for causing frictional contact between the wires. Shown is the edge surface of upper sheave 1, into which is cut a peripheral groove 6 of generally V shape. The wires 2 are caused to slide down the slope of groove 6, tension pushing one into the other, for the provision of contact.

The present invention provides a substantially increased reliability of contact for highly oxidizing wire such as aluminum and aluminum iron alloys. As shown in FIG. 3, into the edge of the upper sheave 1 is cut a groove 7 of predetermined dimensions, specific to a particular range of wire diameters. The width of the groove, as measured at a height ½ the wire width from the bottom supporting surface of the groove, is from 1½ to less than two times the width of the wire. Preferably, the width of the groove is just slightly smaller than twice the width of the wire. In one successful prototype the groove was 7 mils narrower than twice the wire width. Accordingly, one wire will fit into the groove, and the second wire will ride over the first wire, bearing thereagainst as well as against the side of the groove. The depth of the groove should of course be sufficient to retain both wires from lateral movement.

It may be seen that during operation, normal tension is exerted on the exiting wire, causing it to tend to squeeze between the side of the groove 7 and the lower wire. Great pressure has been found to exist between the two wires, which provides a reliable electrical contact therebetween.

While it is preferred that the groove have sides which are parallel to each other, some outward angling thereof can be tolerated, preferably no more than about 30° from the plane of the sheave such as angled groove being shown in FIG. 3a which, as with FIG. 3, shows a portion of the rim of a sheave.

Having established reliable electrical contact, the remaining problem of jerky exiting of the wire 2 from the sheave has been solved by making the angle α about 45° or less.

Utilizing an insulating groove surface, an overlap angle and peripheral groove as noted above, a highly reliable and smoothly operating wire annealing machine by induction is obtained. The wire has been found to exit from the first sheave with virtually no sparking, and is substantially evenly annealed. The previously noted periodically required shutdown for cleaning of oxide has been found to be substantially reduced.

It should be noted that the surface of the groove 7 is preferably made of insulative material. For instance, the pulley or sheave can be provided with a hard anodized rim or tire of aluminum alloy of tool grade hardness. The anodization provides a hard oxide and thus insulative surface over which wire 2 bears.

If desired, a sheave could be used with a hardened insulative insert to form groove 7. A further alternative is to make sheave 1 out of fully insulating material.

FIG. 4 shows a preferred configuration of an annealing machine utilizing the inventive idea described herein. Wire 2 is passed around upper sheave 1, within a groove such as groove 7 described with respect to FIG. 3. The wire is passed around an idler pulley 8, and also around lower sheave 3. The wire then passes around a capstan 9 and idler pulley 10, by which it is driven, thence passing around the upper sheave 1 for a second time, also within groove 7 as described earlier with reference to FIG. 3 the angle of overlap between incoming and outgoing wire being α.

The wire then passes around a snatching roller 20, which maintains the aforenoted angle of overlap α on the sheave 1, allowing smooth pay-out of the wire. It then passes around capstan 9, for drive-pulling the wire, before leaving the machine.

An induction coil 4 is located between idler pulley 8 and the lower sheave 3. Accordingly it may be seen that the wire passing through induction coil 4 forms a short circuited secondary winding, the short circuit occurring between the wires within groove 7 of upper sheave 1.

It shall be noted that during annealing the wire is rendered hot, and thus lengthens. Since the wire, after annealing, rides proud of the wire entering over sheave 1, the increased radius accommodates the increased hot wire length.

In order to allow the machine to be used both for aluminum types of wire as well as slowly oxidizing types of wire such as copper or brass, it is preferred to envelope the wire 2 with steam during and after heating in order to retard oxidation of the copper or brass, which occurs rapidly at high temperatures. Consequently the lower sheave 3 can be encased with pipes 11 and 12 extending upwardly, through which the wire 2 passes. These pipes are not required for aluminum types of wire, as steam will not be used during their annealing. However, by using this structure without the use of steam for aluminum wire, the machine is useful for annealing both rapid and slow oxidizing kinds of wire.

Pipe 11 passes completely through induction coil 4, and steam can be introduced by suitable means at its entry. Condensate can be removed at the bottom of the encasement of the lower sheave 3, or the steam can be ejected at the exit of pipe 12.

It should be noted that since the lower sheave 3 is not located in a water bath as was often the case in the prior art, the rim temperature against which the wire bears can be maintained at the optimum annealing temperature thereof, such as 600° F for aluminum iron alloy wire.

The above-described structure, utilizing the present invention has been found to be extremely effective, and no evidence of arcing was noticed at various speeds at least up to a wire speed of 4,000 feet per minute.

With an understanding of the above, it will clear one skilled in the art may now design various modifications utilizing the principles of the present invention. All are considered to be within the spirit and scope of the present invention, as defined by the appended claims.

The embodiments of the invention in which an exclusive property or privilege is claimed are defined as follows:

1. Apparatus for use during induction heating of wire comprising an upper sheave for supporting said wire around a first defined portion of the sheave periphery and for supporting said wire after induction heating around a second defined portion of said periphery, there being an overlap of the first and second portions, the improvement comprising a peripheral groove formed of insulating material around the rim of the sheave for simultaneously retaining both wires around said defined portions of the sheave, the width of the groove at a height ½ the wire width from the bottom supporting surface of the groove being from 1½ to less than 2 times the width of the wire, the apparatus being such that said overlap of said defined portions as measured on the sheaves being about 45° or less.

2. Apparatus as defined in claim 1 in which the groove is comprised of parallel opposed sides.

3. Apparatus as defined in claim 1 in which the groove is comprised of opposed sides each being angled outwardly from the plane of the sheave a maximum of about 30°.

4. Apparatus as defined in claim 1 wherein said groove is about seven mils narrower than twice the diameter of the wire.

5. Apparatus for use during induction heating of wire, comprising;
 (a) an upper sheave having a peripheral groove formed of insulating material around it rim,
 (b) a lower sheave,
 (c) an induction coil,
 (d) pulley means for guiding a wire in the groove around a first defined portion of the upper sheave, around the lower sheave, and in said groove around a second defined portion of the upper sheave, and passing through the induction coil between the two sheaves, the first and second defined portions of the upper sheave overlapping over an angle which measured on the upper sheave is about 45° or less,
 (e) the width of the groove at a height ½ the wire width from the bottom supporting surface of the groove being from 1½ to less than 2 times the width of the wire.

6. Apparatus as defined in claim 5 in which the groove is comprised of parallel opposed sides.

7. Apparatus as defined in claim 5 in which the surface of the groove is of anodized aluminum alloy of tool grade hardness.

8. Apparatus as defined in claim 5 wherein said groove is about seven mils narrower than twice the diameter of the wire.

9. Apparatus as defined in claim 5 in which the (d) pulley means includes means for passing the wire around the first portion of the upper sheave, through the induction coil, around the lower sheave and then around the second portion of the upper sheave.

10. Apparatus as defined in claim 9 further including means for passing and confining steam around the wire as it passes through and past the induction coil.

11. Apparatus as defined in claim 9, further including a capstan around which the wire is passed, between the lower sheave and the upper sheave.

12. Apparatus as defined in claim 9, in which the surface of the groove is of anodized aluminum alloy of tool grade hardness.

* * * * *